US012012970B2

(12) United States Patent
Euler-Rolle

(10) Patent No.: US 12,012,970 B2
(45) Date of Patent: Jun. 18, 2024

(54) AXIAL FAN WITH OPENINGS IN THE HUB

(71) Applicant: Thomas Euler-Rolle, Vienna (AT)

(72) Inventor: Thomas Euler-Rolle, Vienna (AT)

( * ) Notice: Subject to any disclaimer, the term of this patent is extended or adjusted under 35 U.S.C. 154(b) by 0 days.

(21) Appl. No.: 17/798,865

(22) PCT Filed: Feb. 11, 2021

(86) PCT No.: PCT/AT2021/060051
§ 371 (c)(1),
(2) Date: Aug. 10, 2022

(87) PCT Pub. No.: WO2021/159161
PCT Pub. Date: Aug. 19, 2021

(65) Prior Publication Data
US 2023/0104569 A1 Apr. 6, 2023

(30) Foreign Application Priority Data
Feb. 11, 2020 (AT) .......................... GM 50025/2020

(51) Int. Cl.
*F04D 29/32* (2006.01)

(52) U.S. Cl.
CPC ...... *F04D 29/329* (2013.01); *F05D 2260/605* (2013.01); *F05D 2260/607* (2013.01)

(58) Field of Classification Search
CPC .... F04D 29/329; F04D 29/703; F04D 29/706; F05D 2260/605; F05D 2260/607
USPC ........................................................ 416/93 R
See application file for complete search history.

(56) References Cited

U.S. PATENT DOCUMENTS 3,533,711 A * 10/1970 Kercher .................. F01D 5/187 416/97 R
4,215,973 A * 8/1980 Saterdal ................ F04D 29/362 416/157 R
5,236,306 A * 8/1993 Hozak ................ B60H 1/00464 416/93 R
5,871,335 A * 2/1999 Bartlett ................. F04D 29/329 416/169 A (Continued)

FOREIGN PATENT DOCUMENTS

CN 101220816 A 7/2008
CN 101846087 A 9/2010

(Continued)

OTHER PUBLICATIONS

ISA European Patent Office, International Search Report Issued in Application No. PCT/AT2021/060051, dated Jun. 10, 2021, WIPO, 7 pages.

(Continued)

*Primary Examiner* — Logan M Kraft
*Assistant Examiner* — John D Bailey
(74) *Attorney, Agent, or Firm* — McCoy Russell LLP

(57) ABSTRACT

The invention relates to an axial fan, having: a fan hub which is rotatable about a centre axis and has a bottom wall and an annularly circumferential side wall, a plurality of fan blades, which protrude from the annularly circumferential side wall of the fan hub, wherein the fan hub has a plurality of outlet openings for letting out gaseous, liquid and/or solid accumulations from the interior of the fan hub to the outside of the fan hub, wherein the plurality of passage openings are provided on the annularly circumferential side wall of the fan hub.

11 Claims, 5 Drawing Sheets

(56) References Cited

U.S. PATENT DOCUMENTS

| | | | | |
|---|---|---|---|---|
| 5,967,764 | A * | 10/1999 | Booth | F04D 25/082 417/370 |
| 6,010,305 | A * | 1/2000 | Hauser | F04D 29/582 416/169 A |
| 6,382,915 | B1 * | 5/2002 | Aschermann | F04D 25/022 416/169 A |
| 6,468,037 | B1 * | 10/2002 | Link | F04D 25/026 416/169 A |
| 7,244,110 | B2 * | 7/2007 | Hong | F04D 29/5806 310/62 |
| 7,616,440 | B2 * | 11/2009 | Franz | F04D 29/5806 361/679.48 |
| 8,091,177 | B2 * | 1/2012 | Cote | F04D 29/325 416/189 |
| 8,899,930 | B2 * | 12/2014 | Innocenti | F04D 29/5806 416/169 A |
| 10,167,766 | B2 * | 1/2019 | Birschbach | F04D 29/281 |
| 10,280,935 | B2 * | 5/2019 | Richardson | F04D 25/02 |
| 10,288,088 | B2 * | 5/2019 | Gabbin | F04D 29/666 |
| 10,823,042 | B2 * | 11/2020 | Nishio | F04D 25/08 |
| 2004/0219401 | A1 * | 11/2004 | Hobmeyr | F04D 29/706 429/415 |
| 2004/0223845 | A1 * | 11/2004 | Caplan | F04D 29/5806 415/173.1 |
| 2011/0280729 | A1 * | 11/2011 | Cote | F04D 29/325 416/204 R |
| 2016/0333734 | A1 * | 11/2016 | Bowden | F01D 25/04 |
| 2018/0216470 | A1 * | 8/2018 | DeFilippis | F01D 5/16 |
| 2019/0170158 | A1 * | 6/2019 | Azzouz | F04D 19/002 |
| 2019/0390680 | A1 * | 12/2019 | Chang | F04D 25/0606 |
| 2022/0049715 | A1 * | 2/2022 | Haaf | F04D 29/541 |

FOREIGN PATENT DOCUMENTS

| | | | |
|---|---|---|---|
| CN | 103133371 | A | 6/2013 |
| CN | 205895693 | U | 1/2017 |
| EP | 0521285 | A1 | 1/1993 |
| EP | 1718872 | B1 | 12/2007 |
| EP | 2085618 | A2 | 8/2009 |
| JP | H0431697 | A | 2/1992 |
| JP | H11230092 | A | 8/1999 |
| TW | 201413113 | A | 4/2014 |

OTHER PUBLICATIONS

China National Intellectual Property Administration, Office Action and Search Report Issued in Application No. 202180007636.7, Feb. 1, 2024, 12 pages. (Submitted with Partial Translation).

* cited by examiner

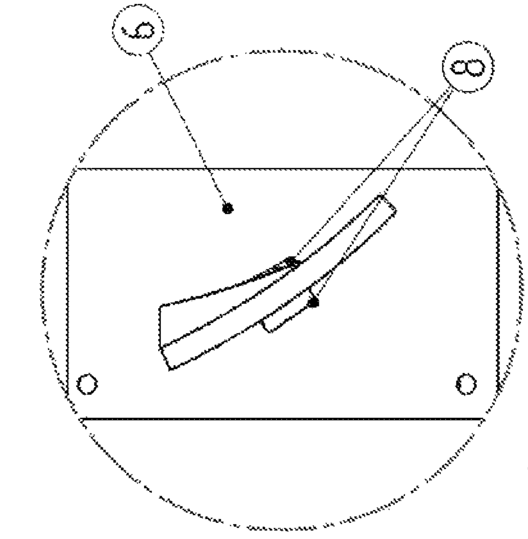
Fig. 6 detail B
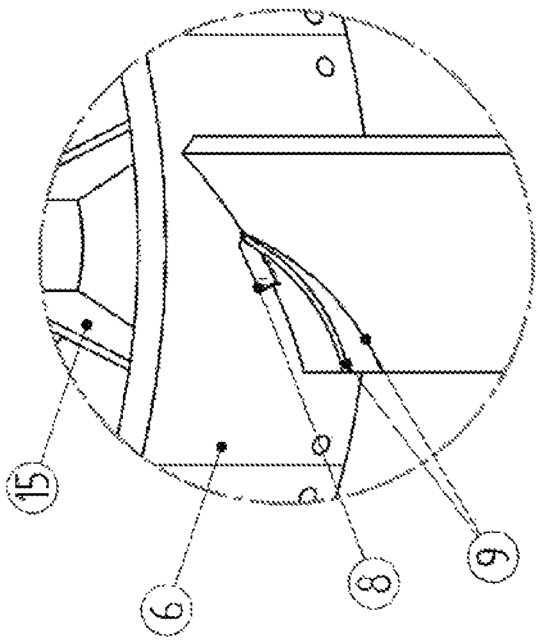
Fig. 5 detail A
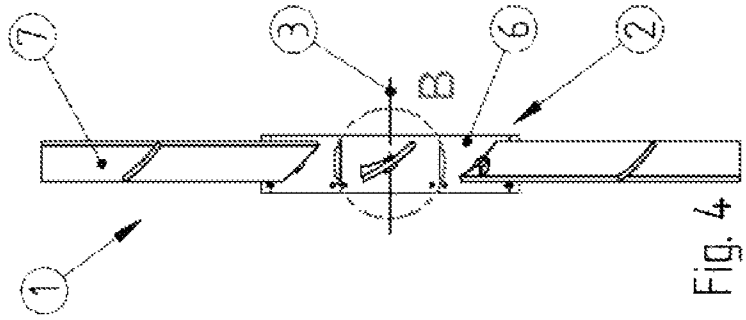
Fig. 4 detail E 14
11a
detail F 14
11b
detail C 13
11a
detail D 11b
13
detail G 14
11
detail H 13
11

AXIAL FAN WITH OPENINGS IN THE HUB

CROSS REFERENCE TO RELATED APPLICATIONS

The present application is a U.S. National Phase of International Application No. PCT/AT2021/060051 entitled "AXIAL FAN WITH OPENINGS IN THE HUB," and filed on Feb. 11, 2021. International Application No. PCT/AT2021/060051 claims priority to Austrian Patent Application No. GM 50025/2020 filed on Feb. 11, 2020. The entire contents of each of the above-listed applications are hereby incorporated by reference for all purposes.

TECHNICAL FIELD

The invention relates to an axial fan, comprising:

a fan hub which is rotatable about a center axis and comprises a bottom wall and an annularly circumferential side wall, a plurality of fan blades, which protrude from the annularly circumferential side wall of the fan hub, wherein the fan hub comprises a plurality of outlet openings for letting out gaseous, liquid and/or solid accumulations from the interior of the fan hub to the outside of the fan hub.

BACKGROUND AND SUMMARY

Such an axial fan is already known from EP 1718 872 B1. In this prior art, a cup-shaped hub with a bottom and an annular side wall is provided. Ribs are arranged on the inside of the hub. In order to remove deposits such as water, sand, soil or sludge from the cavity of the hub, the hub comprises passage openings at the bottom. The passage openings are located at those corner areas of the hub bottom which are formed by the side wall and the internal ribs. In use, the centrifugal force drives the deposits along the ribs into the corner areas and from there they are discharged to the outside through the passage openings. Hereby, the side wall and the respective rib form a double barrier which is intended to facilitate the removal of the deposits.

In practice, however, it has been shown that the removal of deposits from the inside of the hub does not always function reliably. Deposits can accumulate at the corners inside the hub. Furthermore, the centrifugal force for the removal of the dirt deposits is insufficiently utilized. Furthermore, there is a need for improvement with regard to the air throughput, especially if the axial fan is operated in both directions of rotation.

Further devices are known from EP 2 085 618 A2, EP 0 521 285 and US 2011/280729 A1.

Accordingly, the object of the present invention is to alleviate or eliminate at least some of the disadvantages of the prior art. In particular, the invention sets itself the goal of improving the removal of accumulations from the interior of the fan hub.

According to the invention, the plurality of outlet openings are provided on the annularly circumferential side wall of the fan hub.

Surprisingly, it has been found that the accumulations, such as moisture or dirt, but also gases, in the interior of the fan hub on the side of the motor can be removed particularly well through the outlet openings in the annularly circumferential side wall. In the rotating state of the axial fan, the accumulations are conveyed outward by the centrifugal force and discharged in the direction of the centrifugal force through the outlet openings in the annularly circumferential, i.e. in particular cylinder-jacket-shaped, side wall. The flow conditions for the removal of the accumulations have proven to be particularly favorable at the side wall. Furthermore, operation of the axial fan in both directions of rotation can be achieved with favorable air throughput.

Preferably, the outlet openings are spaced apart from both annular side edges of the side wall so that the outlet openings are located entirely within the side wall of the fan hub. In a preferred embodiment, the bottom wall is free of passage openings for the accumulations coming from the interior of the fan hub. However, the bottom wall can include a lead-through for a motor shaft. In the assembled state, the motor shaft is arranged in a substantially precisely fitting manner in the lead-through, which is preferably located in the center of the bottom wall.

In a preferred embodiment, at least one outlet opening is provided on the annular side wall of the fan hub for each fan blade. In this way, residues can be reliably removed from the interior of the fan hub. Preferably, the outlet openings are arranged at regular intervals on the side wall of the fan hub so that uniform removal over the circumference of the fan hub is achieved.

In order to achieve effective extraction of the accumulations from the fan hub the outlet openings are, in a further embodiment, directly adjacent to the fan blades. In this embodiment, the air flow is guided along the fan blade after passing through the outlet opening, thus achieving particularly effective removal of the accumulations.

In a further embodiment, it is favorable if one outlet opening is provided on each of the opposite outer sides of the fan blades. Thus, two outlet openings can be provided per fan blade. This embodiment is particularly favorable in that the fan can be operated effectively in both directions of rotation.

The outlet openings can be implemented as slots.

To further improve extraction from the interior of the fan hub, elevations which protrude from the annular side wall can be provided next to the outlet openings. Comprehensive investigations have shown that these elevations increase the airflow through the outlet openings, thereby improving the removal of accumulations from the fan hub.

In one embodiment variant, the elevations rise toward the outlet openings so that the elevations are in the form of ramps.

Depending on the embodiment, the elevations can each comprise a substantially constant slope or a slope that increases toward the respective outlet opening.

If the fan hub has a plurality of sector elements which are connected to one another via interlocking connecting elements, the axial fan can be disassembled and reassembled with little effort.

Strip elements and recesses can be provided as interlocking connecting elements. The strip elements and the recesses have corresponding cross sections. A positive-locking connection is thus achieved. For example, the strip elements and the recesses can each be formed to have a round cross section.

In order to establish a secure and durable connection, in a preferred embodiment, the interlocking connecting elements extend substantially over the entire height of the annular side wall.

Depending on the embodiment, at least four, in particular at least six, for example eight, sector elements can be provided. Preferably, each sector element comprises exactly one fan blade. The sector elements together form the fan hub with the annularly circumferential side wall. Accordingly, each sector element has an opening angle which corresponds substantially to the ratio of 360 degrees and the number of sector elements. For example, with eight sector elements, the opening angle of the sector elements is 45 degrees.

In order to guide the air flows to the outlet openings on the annular side wall of the fan hub, the fan hub, in a preferred embodiment, comprises ribs on the inside of the bottom wall. Stiffening ribs which extend to the inside of the side wall can be provided. Furthermore, air guide ribs can be provided between the stiffening ribs, which preferably end at a distance from the side wall.

For operation of the axial fan, a shaft of a motor can be connected to the fan hub. The shaft extends through the interior of the fan hub to the lead-through which is arranged in the center of the bottom wall. The motor can be an electric motor, in particular a "brushless" motor.

BRIEF DESCRIPTION OF THE FIGURES

The invention is further explained below with reference to two exemplary embodiments, which are illustrated in the drawings.

FIG. 4 shows a side view of the axial fan of FIGS. 1 to 3.

FIG. 5 shows detail A of FIG. 2 in enlarged view.

FIG. 6 shows detail B of FIG. 4 in enlarged view.

DETAILED DESCRIPTION

Figure 1:
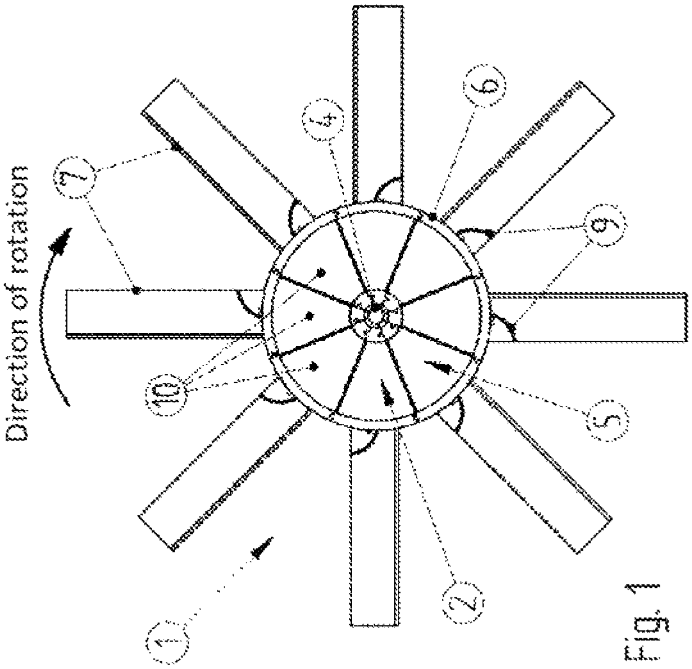
FIG. 1 shows a top view of an axial fan according to the invention.

FIG. 1 shows an axial fan 1 with a fan hub 2 which rotates about a center axis 3 (cf. FIG. 4). In the embodiment shown, the axial fan can be operated effectively in both directions of rotation. A direction of rotation is shown by way of example with an arrow. The fan hub 2 has a central lead-through 4 for a shaft of a motor (not shown). The fan hub 2 has a bottom wall 5, which is circular in plan view, and a cylinder-jacket-shaped side wall 6. The bottom wall 5 is arranged substantially perpendicular to the center axis 3. The side wall 6 extends axially symmetrically about the center axis 3. Thus, the fan hub 2 is cup-shaped, with the bottom wall 5 and the side wall 6 defining an interior 2*a*. The motor can be arranged at least partially within the interior 2*a*. The axial fan 1 also has a plurality of fan vanes or fan blades 7, in the example shown eight fan blades 7, which protrude radially outwards from the side wall 6 of the fan hub 2.

The fan hub 2 has a plurality of outlet openings 8 which are arranged to transport gaseous, liquid and/or solid accumulations produced during operation from the interior 2*a* of the fan hub 2 to the outside 2*b* of the fan hub 2. Such accumulations can be, for example, water, dirt or gases, which could impair the operation of the axial fan 1 if they remain in the interior 2*a*. In the embodiment shown, the passage openings 8 are formed on the annularly circumferential side wall 6, thus not on the bottom wall 5. At least one outlet opening 8 is provided for each fan blade 7. In the embodiment shown, two outlet openings 8 are provided on both sides of each fan blade 7. The outlet openings 8 are formed here as slots. Since the outlet openings 8 in the embodiment shown are directly adjacent to the outer sides of the fan blades 7, the air flows are guided along the outer sides of the fan blades 7 after passing through the outlet openings, as indicated in the drawings by flow lines 9.

Figures 11, 12, 13, 14, 15, 16:
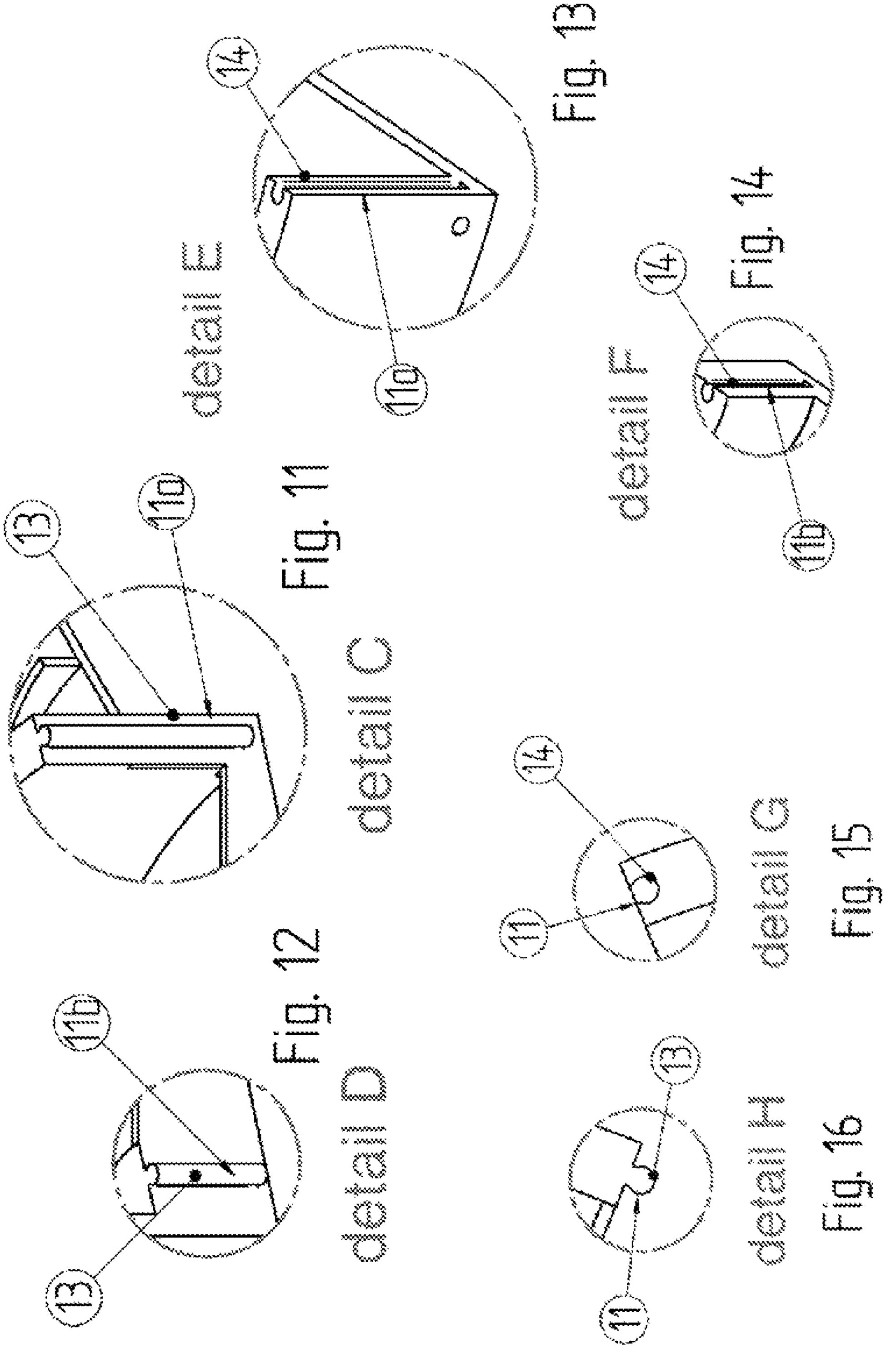
FIG. 11 shows detail C of FIG. 7 in enlarged view.
FIG. 12 shows detail D of FIG. 7 in enlarged view.
FIG. 13 shows detail E of FIG. 8 in enlarged view.
FIG. 14 shows detail F of FIG. 8 in enlarged view.
FIG. 15 shows detail G of FIG. 9 in enlarged view.
FIG. 16 shows detail H of FIG. 9 in enlarged view.
Figure 21:
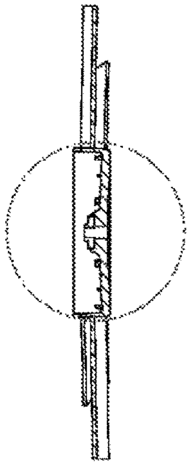
FIG. 21 shows a section along line XXI-XXI in FIG. 17.
Figure 22:
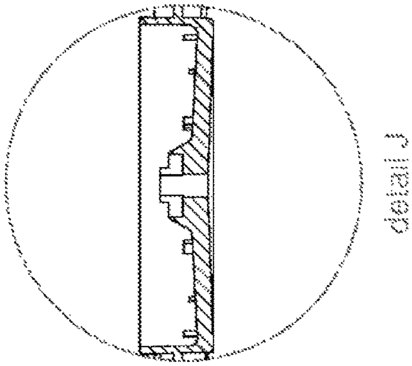
FIG. 22 shows detail J of FIG. 21 in enlarged view.

In the embodiment of FIGS. 1 to 16, the fan hub 2 is composed of several sector elements 10, here for example eight sector elements 10. The individual sector elements 10 are connected to each other via interlocking connecting elements 11. The connecting elements 11 can be inserted into one another in the axial direction (i.e. in the direction of the center axis 3). In the embodiment shown, outer connecting elements 11*a* are provided on the side wall 6 and inner connecting elements 11*b* are provided on a projection 12 which delimits the lead-through 4 for the motor shaft. In the embodiment shown, strip elements 13 (cf. in particular FIG. 16) and recesses 14 (cf. in particular FIG. 15) are provided as interlocking connecting elements 11, which have matching cross sections, in this case round cross sections, so that the connecting elements can be connected to one another in a substantially precisely fitting manner. The connecting elements 11 extend substantially over the entire height of the annularly circumferential side wall 6.

Figure 2:
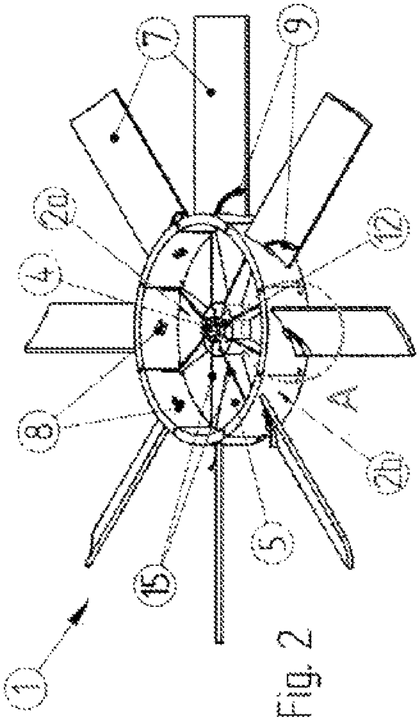
FIG. 2 shows a perspective view of the axial fan of FIG. 1.
Figure 3:
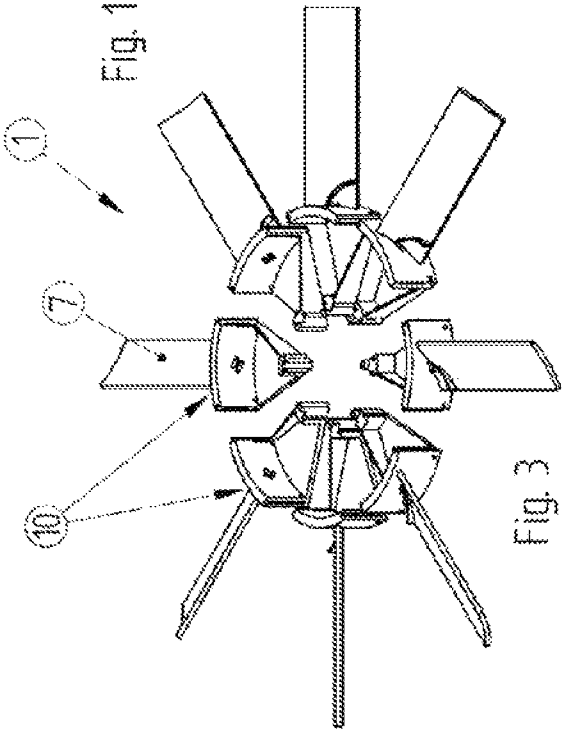
FIG. 3 shows a view of the axial fan of FIGS. 1, 2 in the disassembled state of individual sector elements of the axial fan.
Figure 10:
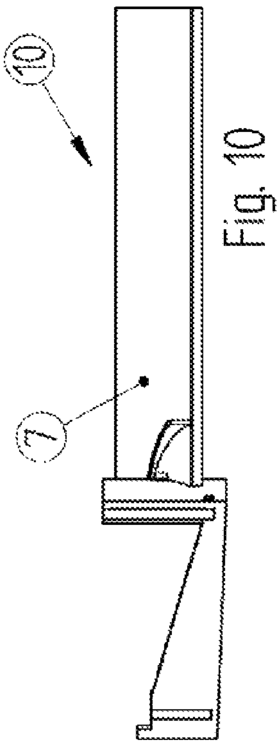
FIG. 10 shows a side view of the sector element of FIGS. 7 to 9.
Figure 9:
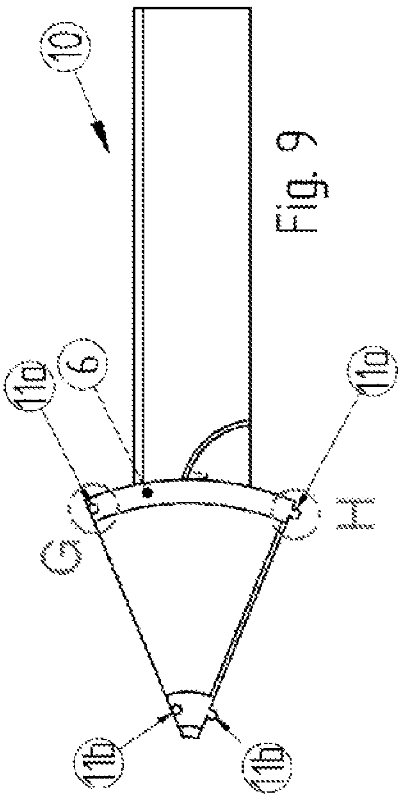
FIG. 9 shows a rear view of the sector element of FIGS. 7 and 8.
Figure 8:
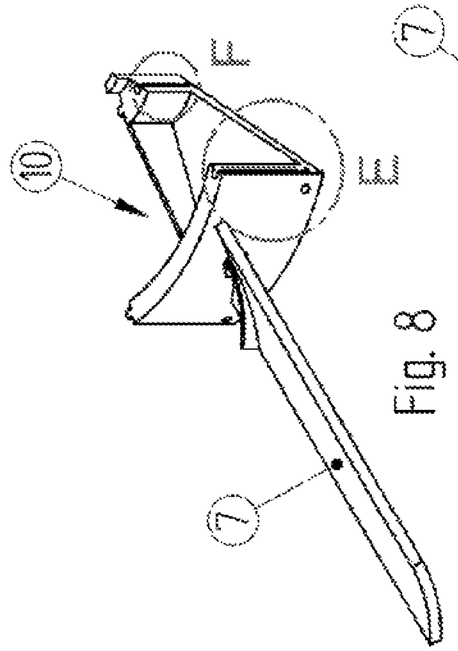
FIG. 7 and FIG. 8 show perspective views of a single sector element of the axial fan of FIGS. 1 to 4.
Figure 7:
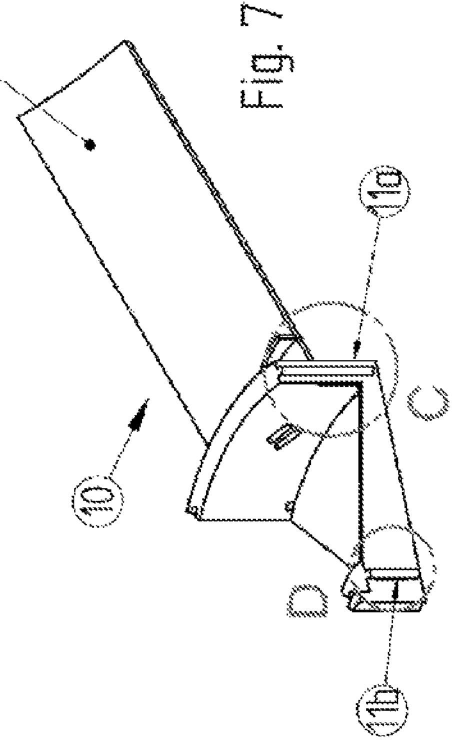

As can be seen in particular from FIG. 2, the fan hub 2 has individual ribs 15 on the inside 6*a* (facing the interior 2*a*) of the bottom wall 6. For example, one rib 15 can be provided per fan blade 7. Thus, in the exemplary embodiment shown, eight ribs 15 are provided in the interior 2*a* of the fan hub 2.

In FIGS. 17 to 23, a further embodiment of the axial fan 1 is shown. In this embodiment, outlet openings 8 are also provided on the annular side wall 6 of the fan hub 2, whereas the bottom wall 5 is free of such outlet openings. Here, the outlet openings 8 are spaced apart from the fan blades 7. Furthermore, next to the outlet openings, individual (and separate from the fan blades 7) elevations 16 are formed (cf. in particular FIG. 23), which protrude outward from the outside of the annularly circumferential side wall 6. The elevations 23 rise in a ramp-like manner towards the outlet openings 8. In the embodiment shown, the elevations 23 each have a substantially constant slope. However, the slope can also increase in the direction of the adjacent outlet opening 8 (not shown).

Figure 18:
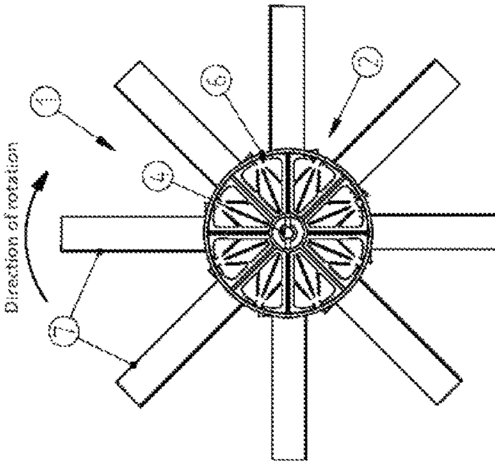
FIG. 18 shows a rear view of the axial fan of FIG. 17.
Figure 20:
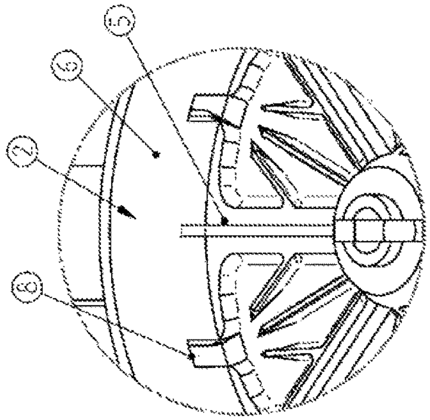
FIG. 20 shows detail I of FIG. 20 in enlarged view.
Figure 23:
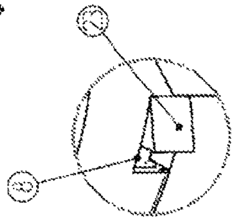
FIG. 23 shows detail K of FIG. 19 in enlarged view.
Figure 17:
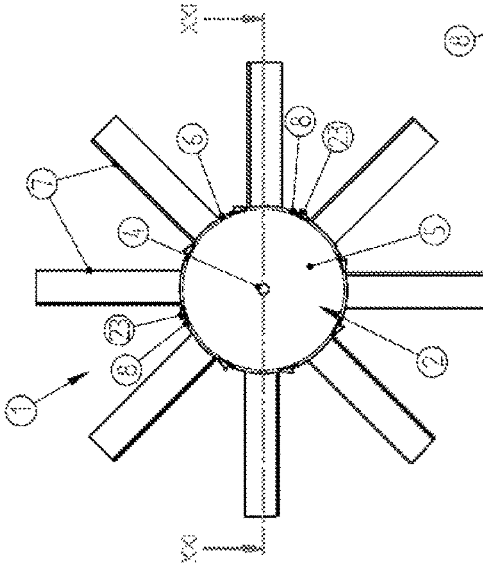
FIG. 17 shows a top view of another axial fan according to the invention.
Figure 19:
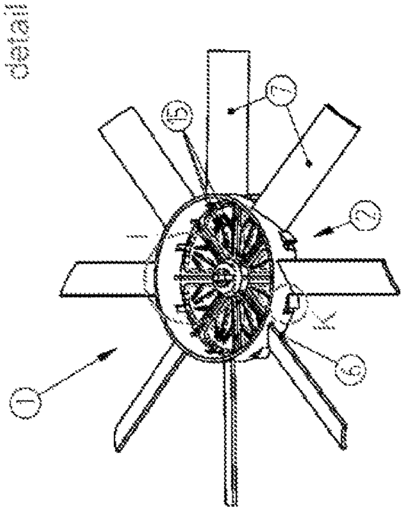
FIG. 19 shows a schematic view of the axial fan of FIG. 17 and FIG. 18.

As can be seen from FIG. 18 and FIG. 19, ribs 15 are also provided in this embodiment, wherein, on the one hand, stiffening ribs 15*a* extend as far as the side wall 6 and air guide ribs are arranged in between, which end in front of the side wall 6.

The invention claimed is:

1. An axial fan, comprising:

a fan hub which is rotatable about a center axis and comprises a bottom wall and an annularly circumferential side wall, and a plurality of fan blades which protrude from the annularly circumferential side wall of the fan hub, wherein the fan hub comprises a plurality of outlet openings for letting out gaseous, liquid and/or solid accumulations from the interior of the fan hub to the outside of the fan hub, and wherein the plurality of outlet openings are provided on the annularly circumferential side wall of the fan hub outside of the fan blades and spaced apart from the fan blades in a circumferential direction.

2. The axial fan according to claim 1, wherein the fan hub comprises a plurality of sector elements which are connected to one another via interlocking connecting elements.

3. The axial fan according to claim 2, wherein strip elements and recesses are provided as interlocking connecting elements.

4. The axial fan according to claim 2, wherein the interlocking connecting elements extend substantially over the entire height of the annularly circumferential side wall.

5. The axial fan according to claim 2, wherein at least four sector elements are provided.

6. The axial fan according to claim 1, wherein next to the outlet openings, elevations are provided which protrude from the annularly circumferential side wall.

7. The axial fan according to claim 6, wherein the elevations rise towards the outlet openings.

8. The axial fan according to claim 7, wherein the elevations each comprise a constant slope or a slope increasing towards the respective outlet opening.

9. The axial fan according to claim 1, wherein at least one outlet opening per fan blade is provided on the annularly circumferential side wall of the fan hub.

10. The axial fan according to claim 1, wherein the fan hub comprises ribs on the inside of the bottom wall.

11. The axial fan according to claim 1, wherein a motor is connected to the fan hub.

* * * * *